United States Patent
Tamura et al.

(10) Patent No.: US 12,525,104 B2
(45) Date of Patent: Jan. 13, 2026

(54) SURVEILLANCE SYSTEM AND SURVEILLANCE DEVICE

(71) Applicant: Hitachi, Ltd., Tokyo (JP)

(72) Inventors: Masato Tamura, Santa Clara, CA (US); Ravigopal Vennelakanti, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 516 days.

(21) Appl. No.: 17/976,687

(22) Filed: Oct. 28, 2022

(65) Prior Publication Data

US 2024/0144794 A1   May 2, 2024

(51) Int. Cl.
| | |
|---|---|
| *G08B 13/196* | (2006.01) |
| *G06T 7/246* | (2017.01) |
| *G06V 10/25* | (2022.01) |
| *G06V 10/74* | (2022.01) |
| *G06V 20/52* | (2022.01) |
| *G06V 20/64* | (2022.01) |
| *G06V 40/10* | (2022.01) |

(52) U.S. Cl.
CPC ........ *G08B 13/19608* (2013.01); *G06T 7/246* (2017.01); *G06V 10/25* (2022.01); *G06V 10/761* (2022.01); *G06V 20/53* (2022.01); *G06V 20/64* (2022.01); *G06V 40/10* (2022.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 8,675,917 B2 | 3/2014 | Brown et al. | |
| 9,740,937 B2 | 8/2017 | Zhang et al. | |
| 10,861,086 B2 | 12/2020 | Glaser et al. | |
| 2020/0193166 A1* | 6/2020 | Russo | G06V 20/52 |
| 2021/0350143 A1 | 11/2021 | Blott et al. | |
| 2022/0141621 A1* | 5/2022 | Shah | G07C 9/00896 |
| | | | 705/13 |
| 2023/0206615 A1* | 6/2023 | Zhang | G06V 20/52 |
| | | | 382/103 |

* cited by examiner

*Primary Examiner* — Vincent Rudolph
(74) *Attorney, Agent, or Firm* — PROCOPIO, CORY, HARGREAVES & SAVITCH LLP (57) ABSTRACT

A method for tracking and monitoring subjects and a plurality of objects. The method may include obtaining an image, wherein the image contains the subjects and the plurality of objects; extracting the subjects and the plurality of objects in the image through first feature extraction; detecting object interactions between the subjects and the plurality of objects; and tracking, through second feature extraction, subject-object pairs having detected object interactions.

12 Claims, 10 Drawing Sheets

FIG. 1

| Time | Duration | State | Person ID | Track ID | Associated object track ID |
|---|---|---|---|---|---|
| 10:00 | 9 min. | steady | 0 | 0 | 10 |
| 10:10 | 1 min. | abnormal | 1 | 1 | 10 |
| 10:05 | 20 min. | steady | 2 | 2 | 13 |

SURVEILLANCE SYSTEM AND SURVEILLANCE DEVICE

BACKGROUND

Field

The present disclosure is generally directed to a method and a system for tracking and monitoring subjects and a plurality of objects.

Related Art

Due to the continuous threats of crimes and terrorism, public safety and security solutions have attracted much attention in recent years. Surveillance cameras are installed in large-scale facilities such as stations and airports, and large volumes of recorded video data are stored for surveillance of the facilities. Due to this large sum of data, it is almost infeasible to monitor all areas and be able to detect crisis manually.

To solve this problem, artificial intelligence (AI)-based video analytics technologies have been developed and deployed to automate monitoring operations such as person tracking and detection of suspicious behavior. Leveraging the technologies, many companies are developing products and solutions for public safety and security with the expectation of expansion in market size.

In the related art, active alerting in surveillance systems is utilized to respond to accidents. However, the associated tracking functions only help users track target objects, and target objects have to be manually determined through event occurrences. Finding events from a large volume of surveillance videos is difficult and delays response time to accidents.

In the related art, object related events such as item handling, theft, and object abandonment are first monitored and detected, and association are then made between people and objects. These methods can be utilized to alert occurrences of suspicious events. However, detectors have to be prepared to target each of the event-based association between a person and object. Furthermore, if deep neural network-based detectors are used to detect events, a large quantity of training data would be required for the detectors for each event and thus rendering such applications impractical.

In the related art, object association is leveraged to find target objects. Object association employed in the method associates people and objects with computer vision technology, and utilizes the association information to identifying target individuals. However, manual operation is needed in the method in order to find or identify a suspicious event/association.

SUMMARY

Aspects of the present disclosure involve an innovative method for tracking and monitoring subjects and a plurality of objects. The method may include obtaining an image, wherein the image contains the subjects and the plurality of objects; extracting the subjects and the plurality of objects in the image through first feature extraction; detecting object interactions between the subjects and the plurality of objects; and tracking, through second feature extraction, subject-object pairs having detected object interactions.

Aspects of the present disclosure involve an innovative non-transitory computer readable medium, storing instructions for tracking and monitoring subjects and a plurality of objects. The instructions may include obtaining an image, wherein the image contains the subjects and the plurality of objects; extracting the subjects and the plurality of objects in the image through first feature extraction; detecting object interactions between the subjects and the plurality of objects; and tracking, through second feature extraction, subject-object pairs having detected object interactions.

Aspects of the present disclosure involve an innovative server system for tracking and monitoring subjects and a plurality of objects. The server system may include obtaining an image, wherein the image contains the subjects and the plurality of objects; extracting the subjects and the plurality of objects in the image through first feature extraction; detecting object interactions between the subjects and the plurality of objects; and tracking, through second feature extraction, subject-object pairs having detected object interactions.

Aspects of the present disclosure involve an innovative system for tracking and monitoring subjects and a plurality of objects. The system can include means for obtaining an image, wherein the image contains the subjects and the plurality of objects; means for extracting the subjects and the plurality of objects in the image through first feature extraction; means for detecting object interactions between the subjects and the plurality of objects; and means for tracking, through second feature extraction, subject-object pairs having detected object interactions.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

An active alerting method with object association technology is disclosed. In this method, the association status of objects is actively monitored. When the status suspiciously changes, an alert is activated. This method can be utilized to find people and objects related events such as identification of unattended objects and theft of objects.

Figure 1:
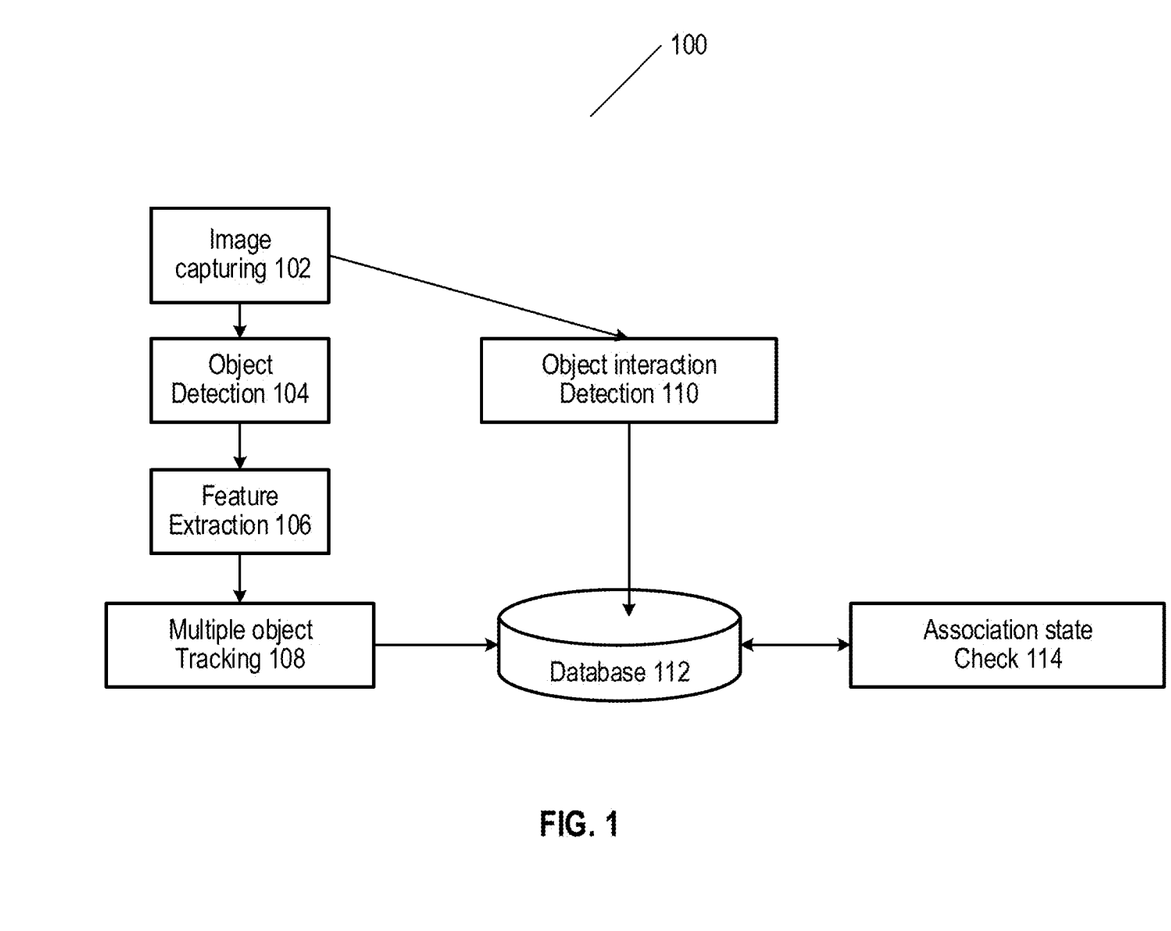
FIG. 1 illustrates an example process flow of an object tracking process, in accordance with an example implementation.

FIG. 1 illustrates an example process flow of an object tracking process 100, in accordance with an example implementation. The object tracking process 100 alerts suspicious events by detecting interactions between people and objects and monitoring the status of association. Image capturing 102 is performed using at least one camera. The captured images are then fed into object detectors for object detection 104 and object interaction detectors for object interaction detection 110. Object detectors localize objects including people in images and output bounding boxes around detected objects.

Images of the detected objects are fed into a feature extractor 106 to transform images into one-dimensional feature vectors. These features are used to calculate similarities of images for multiple object tracking 108. The tracking information is then sent to database 112 for storage. Object interaction detection 110 associate objects in images and send the association information to database 112. Association state check 114 monitors state information associated with identified people/subjects and objects and stores the monitored information to the database 112.

Figure 2:
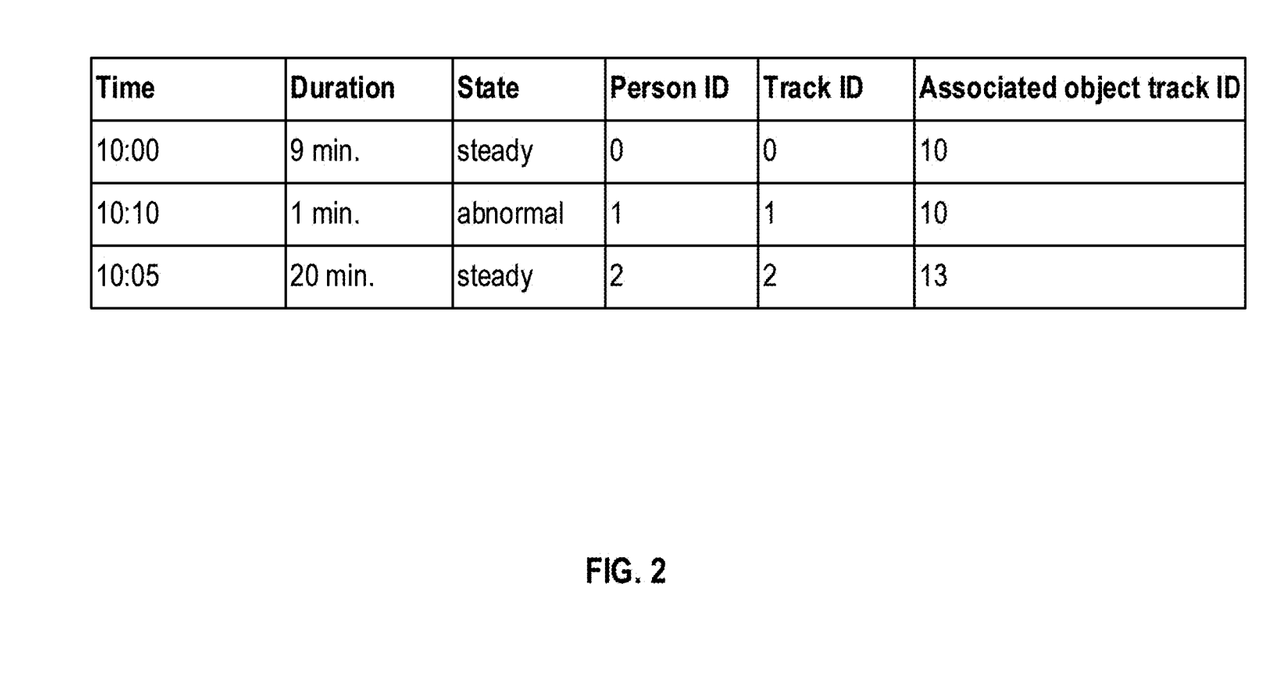
FIG. 2 illustrates an example tracking table stored in the database, in accordance with an example implementation.

FIG. 2 illustrates an example tracking table stored in the database 112, in accordance with an example implementation. State information monitored by the association state check 114 is stored in the database 112 in the form of the tracking table. The tracking table stores information involving time information, duration information, state information, person ID, track ID, and associated object track ID. Information of tracked people is stored at each row and associated object is indicated in the last column under associated object track ID. Time information identifies the time of event occurrence. Duration information tracks the amount of time associated with the occurred event, e.g., the amount of time that has elapsed since occurrence of an event and prior to occurrence of a subsequent event in association with the same object, etc. State information identifies whether a state is steady/stable or an abnormal behavior has been observed. Person ID is associated with a monitored person/subject and is unique to the person/subject. Tracked ID identifies the track number associated with a person identified by Person ID. Specifically, Track IDs are used to identify tracking results of people. A person may be tracked/captured by a number of monitoring devices such as cameras, and as such, the person may have multiple tracking results that correspond to the number of cameras. Associated object track ID identifies a monitored object.

Taking the first entry as an example, an object with an object ID of 10 was associated with a person associated with the person ID of 0 for a monitored duration of 9 minutes. However, the object was then associated with another person with the person ID of 1. This event is recognized as abnormal by the association state check 114 and as a result, an alert is triggered and a notification is generated. The monitoring process can be performed in real-time and assists users or operators in immediate identification of suspicious activities.

Object interaction detector can also be used to group people in images. If an object associated with a person is associated with another person in the same group, this event is regarded as normal and hence an alert is not issued.

Figure 3:
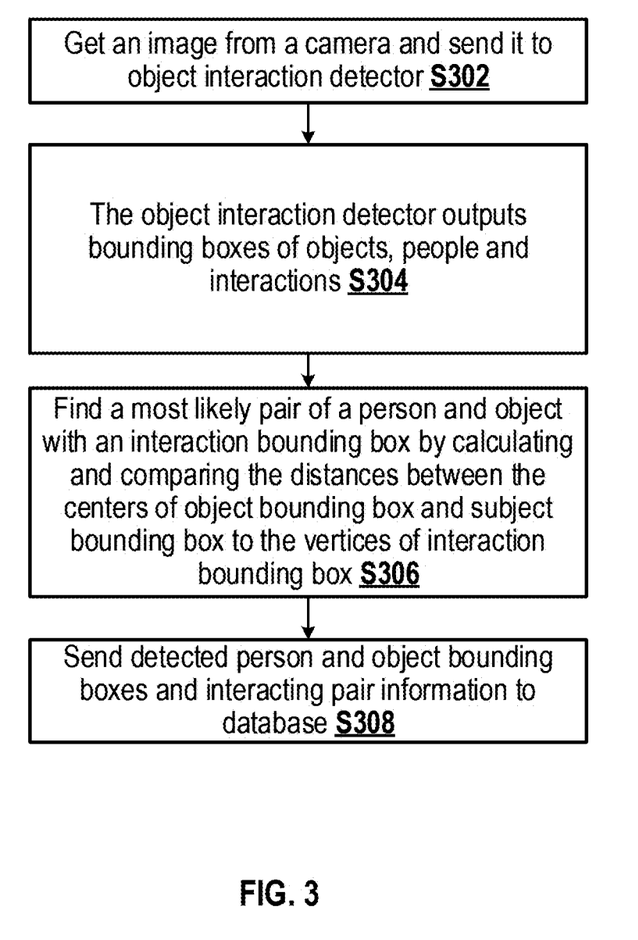
FIG. 3 illustrates an example process flow of the object interaction detection, in accordance with an example implementation.

FIG. 3 illustrates an example process flow of the object interaction detection 110, in accordance with an example implementation. At S302, an image is received from a camera and sent to the object interaction detector. At S304, the object interaction detector outputs bounding boxes of objects, people, and predicted interactions. The predicted interaction bounding boxes are placed between pairs of a detected object and a detected person. With every predicted interaction bounding box, a first vertex of the vertices is placed near the center of an associated subject bounding box of the detected person. A second vertex diagonal to the first vertex is placed near the center of an associated object bounding box of the detected object. At S306, a most likely pair of a person and an object as having an interaction is found by calculating and comparing the distances between the centers of the subject bounding boxes and the object bounding boxes with the closest respective vertices of the interaction bounding boxes. The most likely pair of a person and an object is one that has an interaction bounding box having the shortest distances between the centers and the vertices. Diagonal lines of interaction bounding boxes connecting between the near center vertices of the interaction bounding boxes approximate lines connecting between centers of the object bounding boxes with subject bounding boxes. At S308, the detected person (subject) and object bounding boxes, and interacting pair information are sent to the database.

Figure 4:
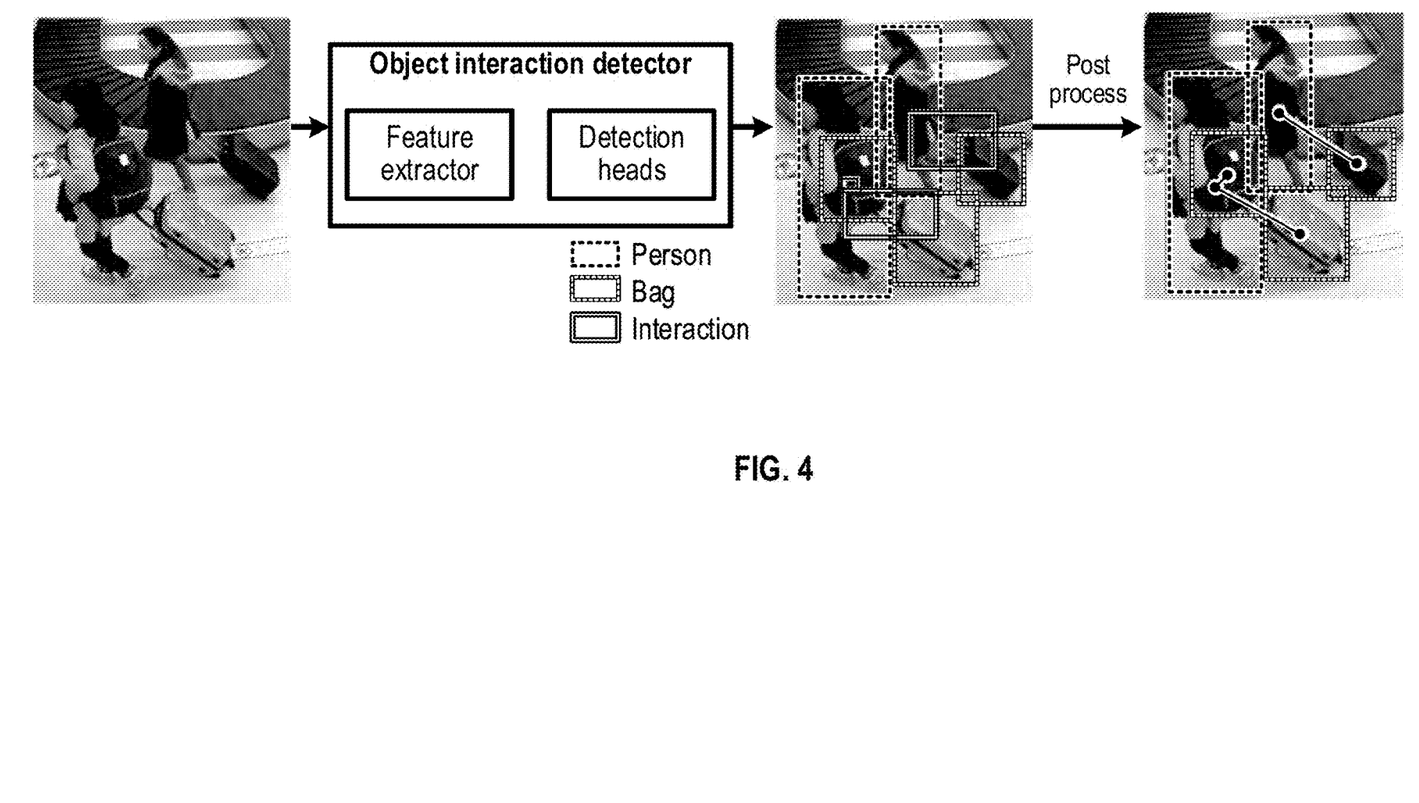
FIG. 4 illustrates an example graphic process flow of the object interaction detection, in accordance with an example implementation.

FIG. 4 illustrate an example graphic process flow of the object interaction detection 110, in accordance with an example implementation. The process begins by receiving an image from a camera and sending the image to the object interaction detector, this corresponds to step S302 of FIG. 3. The object interaction detector comprises a features extractor and a detection heads unit. The feature extractor utilizes a trained neural network to identify people and objects contained within the received image. The detection heads unit assigns different types of bounding boxes and positions the bounding boxes over the detected people and objects, as well as the interaction between the people and objects. The different types of bounding boxes include, but not limited to, person/subject, object, luggage, backpack, interaction, etc. The interaction bounding boxes are generated between people and objects. Distances between the centers of the subject bounding boxes and the object bounding boxes with the closest respective vertices of the interaction bounding boxes are calculated and then compared. The interaction bounding boxes are transformed into subject-object pairs in the post-processing based on the calculated distances and lines connecting between subjects and objects of subject-object pairs are generated to establish the relationship and used for relationship tracking/monitoring. The information of paired people and objects is sent and stored in databases.

Feature extractor utilizes a neural network to extract features and identify people, objects, and interactions. Detection heads module then positions the different types of bounding boxes based on extracted features over the identified people, objects, and interactions.

Figure 5:
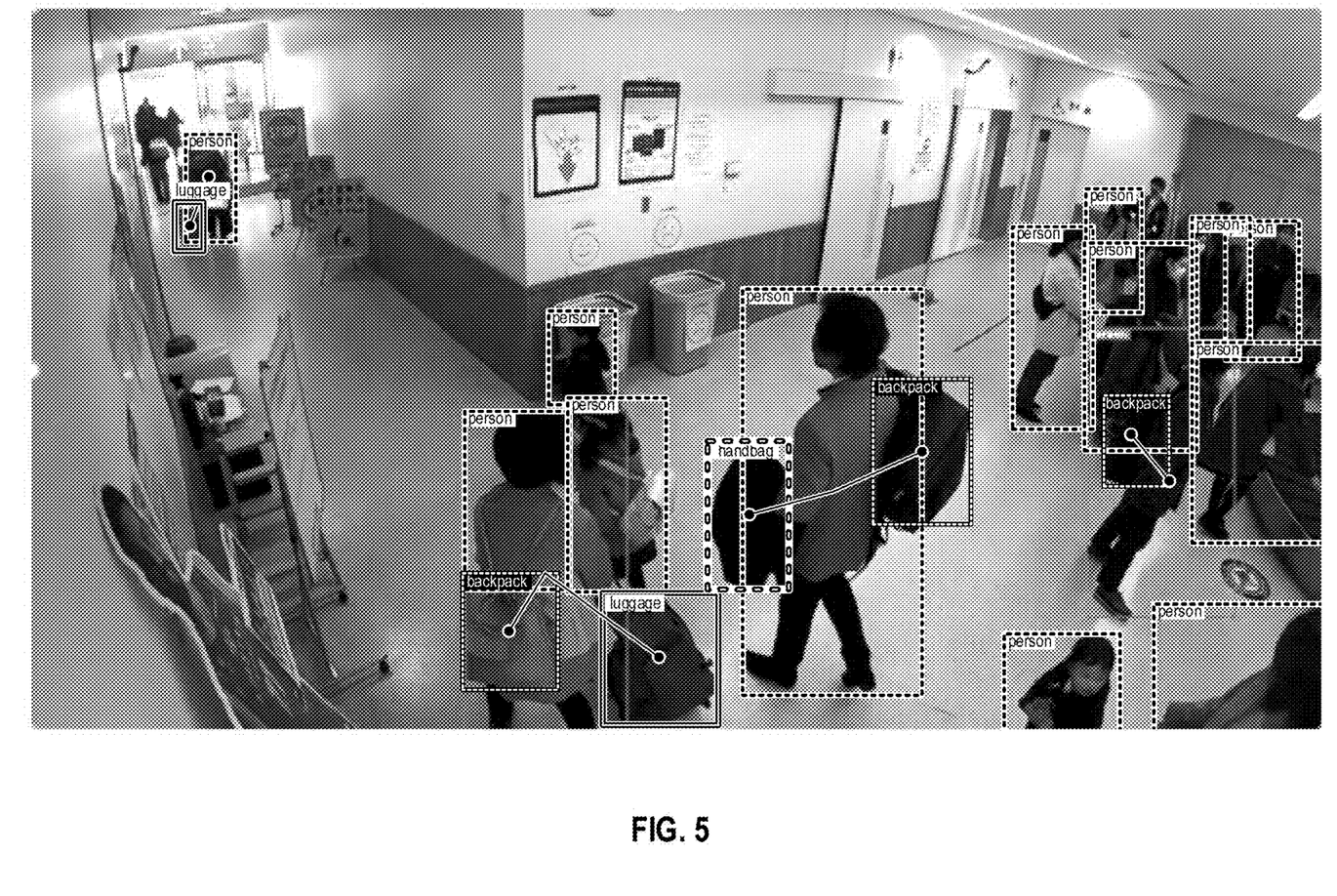
FIG. 5 illustrates an example application of bounding boxes with object information affixed, in accordance with an example implementation.

In some example implementations, object information pertaining to the different objects captured within the bounding boxes may be affixed to the bounding boxes and forming part of the display (e.g., person, bag, luggage, interaction, etc.) FIG. 5 illustrates an example application of bounding boxes with object information affixed, in accordance with an example implementation.

Figure 6:
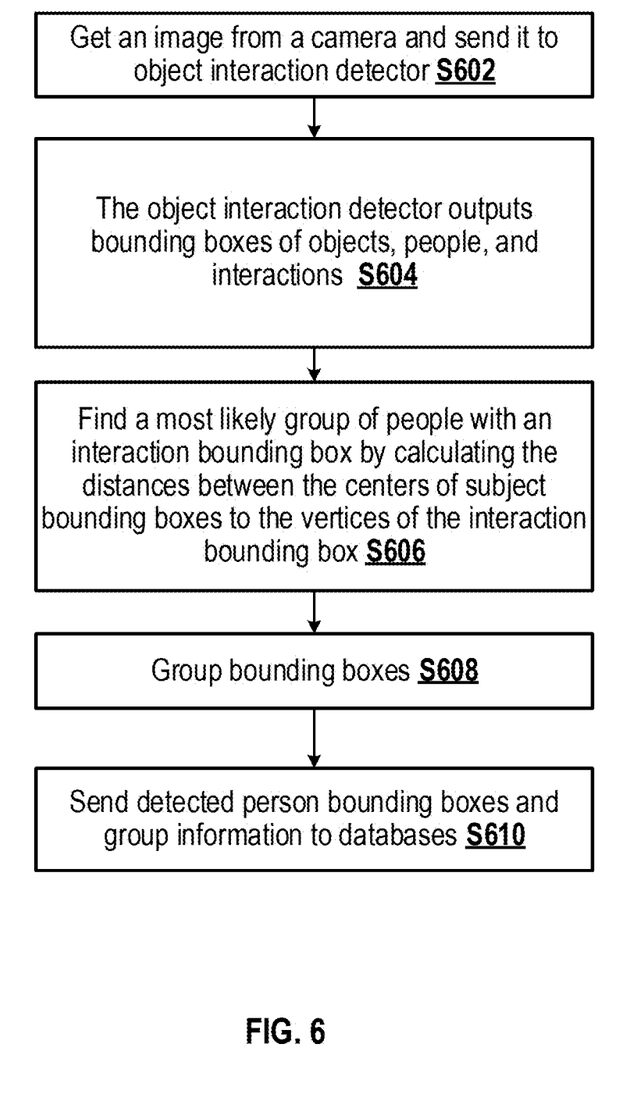
FIG. 6 illustrates an example process flow of grouping people/subjects using the object interaction detection, in accordance with an example implementation.

FIG. 6 illustrates an example process flow of grouping people/subjects using the object interaction detection 110, in accordance with an example implementation. The process flow of FIG. 6 can be performed in addition to the process flow illustrated in FIG. 3 to further establish subject group relationship to identified object. At S602, an image is received from a camera and sent to the object interaction detector. At S604, the object interaction detector outputs bounding boxes of objects, people, and predicted interactions. The predicted interaction bounding boxes are placed between pairs of detected people, with a first corner/first vertex placed near the center of a first subject bounding box of the first person/subject and a diagonal corner/second vertex located at the center of a second subject bounding box of the second person/subject. At S606, a most likely pair of subjects as having an interaction is found by calculating and comparing the distances between the centers of the two subject bounding boxes with the closest respective vertices of the interaction bounding boxes. The most likely pair of subjects is one that has an interaction bounding box having the shortest distances between the subject bounding box centers and the vertices of the associated interaction bounding box. Diagonal lines of interaction bounding boxes connecting between the near center vertices of the interaction bounding boxes approximate lines connecting between centers of the subject bounding boxes. At S608, interaction bounding boxes are grouped together to establish subject groups. At S610, the detected person (subject), bounding boxes, and interacting pair information are sent to the database.

Figure 7:
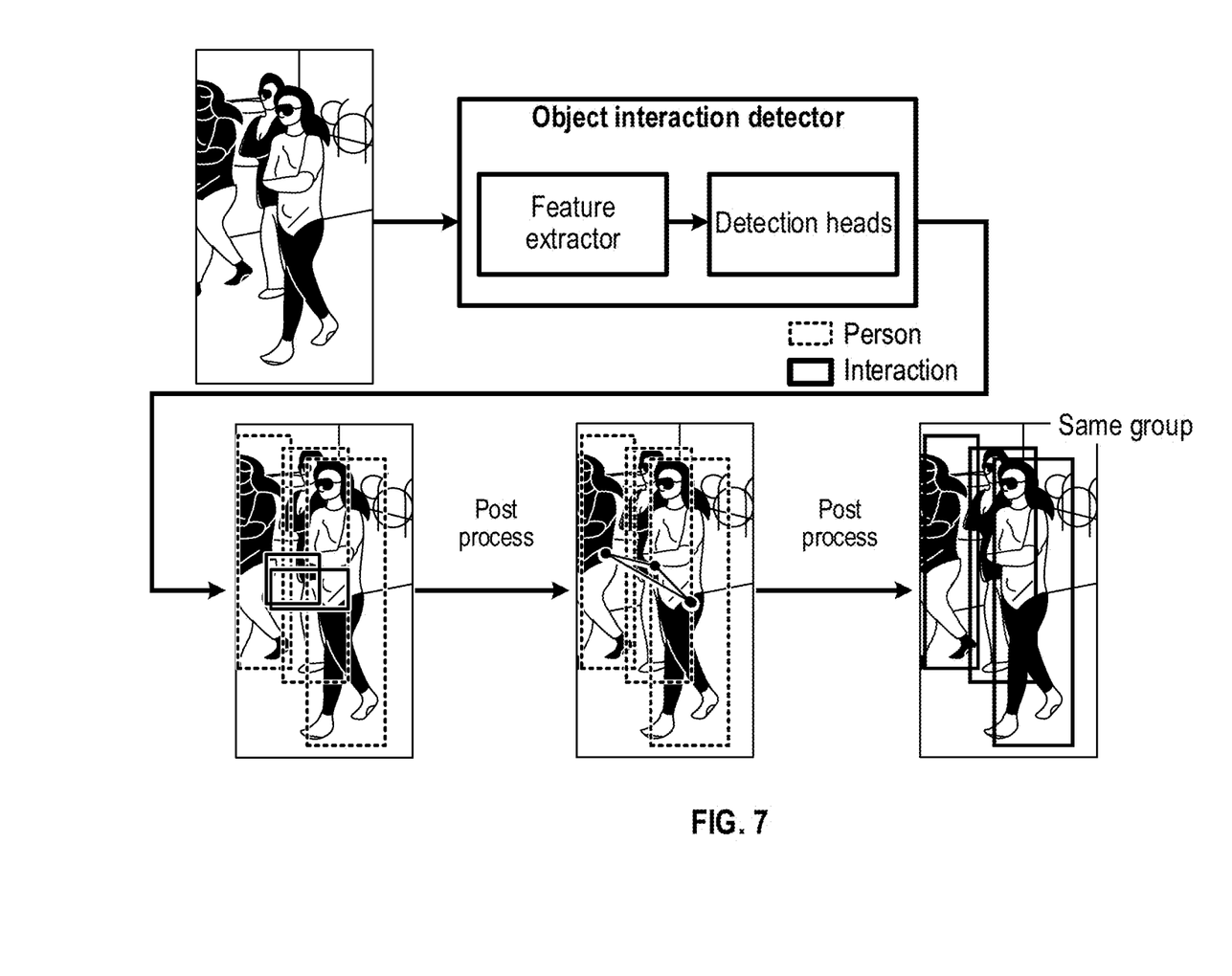
FIG. 7 illustrates an example graphic process flow of the object interaction detection in association with subject group detection, in accordance with an example implementation.

FIG. 7 illustrate an example graphic process flow of the object interaction detection 110 in association with subject group detection, in accordance with an example implementation. The process prevents false alerts by finding a group of people and recognizing association changes inside the group as normal events using the object interaction detection 110. People/subject are first associated in the same way as associating people and bags in FIGS. 3-5. All the associated people are recognized as belonging in the same group and interaction bounding boxes of subjects are grouped together to establish subject group(s). The group information is sent to and stored in databases.

The people association information is stored with confidence scores that are generated from the object interaction detectors. These confidence scores can be used to control the group sizes with confidence thresholds. For instance, if a high confidence threshold is set to suppress interaction detection results of low confidence scores, people are likely to be associated to others close to them, and group sizes are reduced. If group sizes are reduced, objects become commonly associated to people outside the subject group and as a result, detection misses can be avoided. If group sizes are increased, objects become commonly associated to people within the same groups and as a result, over-alerting of events can be prevented. The confidence threshold can be dynamically changed to control group sizing.

Example implementations can be used to alert object theft events. People and objects are tracked by using typical computer vision technologies such as object detection, object tracking, and object re-identification. The tracking information is then stored in databases. In addition to tracking information, described object association information and group information can also be stored in the databases. If a specific object is determined to have been associated with a person for a certain amount of time, the state of the association is set to steady. If the associated object is suddenly associated to another person, the state is set to abnormal, and the event is alerted.

Figure 8:
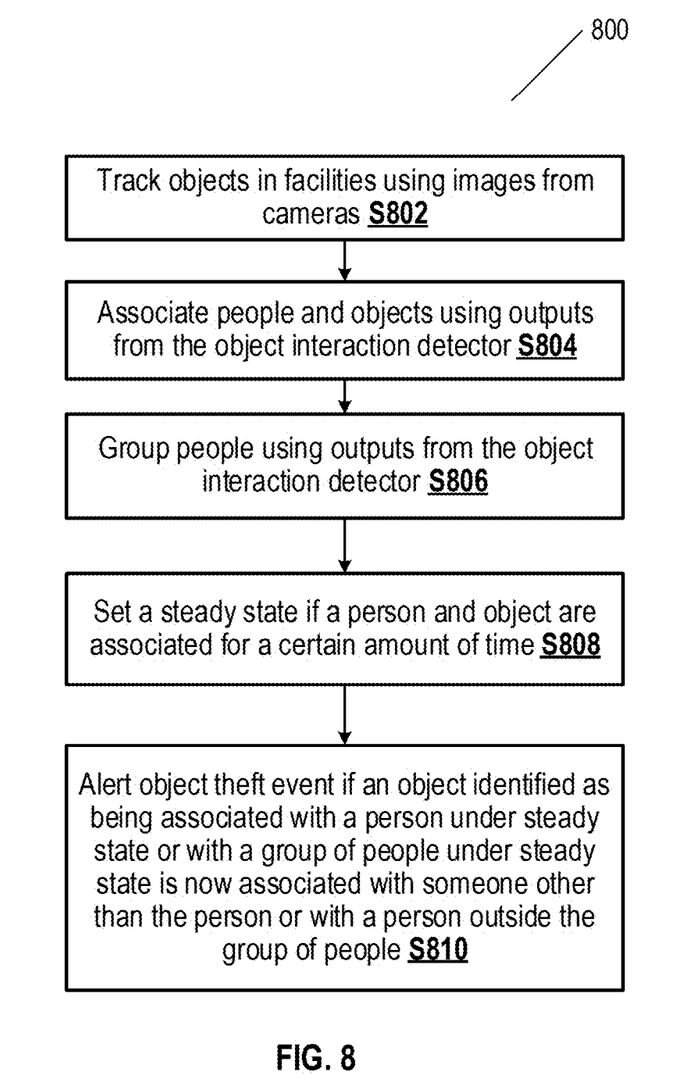
FIG. 8 illustrates an example process flow of theft monitoring process, in accordance with an example implementation.

FIG. 8 illustrates an example process flow of theft monitoring process 800, in accordance with an example implementation. As illustrated in FIG. 8, the process begins at S802, where objects in facilities are tracked using images obtained from cameras. At S804, people/subjects and objects are associated using outputs from the object interaction detector. At S806, detected people are grouped using outputs from the object interaction detector. At S808, setting a steady state if a person and an object are associated or determined as having ownership relation that remains unchanged for a certain amount of time/time threshold. At S810, if an object identified as being associated with a person under steady state or with a group of people under steady state is now associated with someone other than the person or with a person outside the identified group of people, the operator is alerted of the occurrence of an object theft event. In some example implementations, the various time thresholds can be adjusted by the operator.

Figure 9:
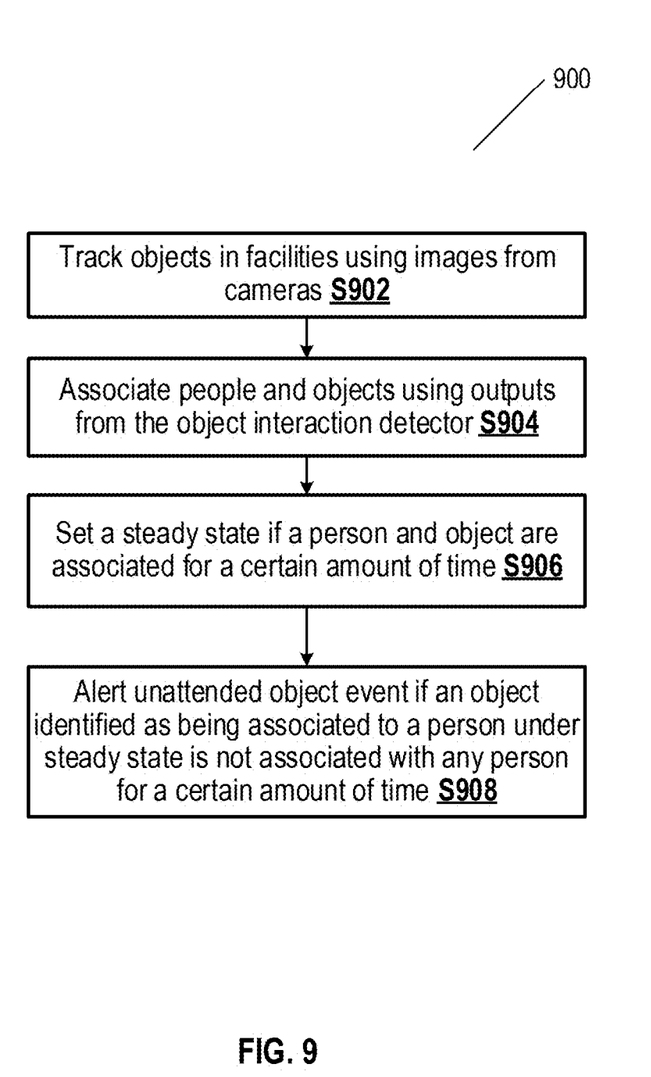
FIG. 9 illustrates an example process flow of unattended baggage monitoring process 900, in accordance with an example implementation.

FIG. 9 illustrate an example process flow of unattended baggage monitoring process 900, in accordance with an example implementation. As illustrated in FIG. 9, the process begins at S902, where objects in facilities are tracked using images obtained from cameras. At S904, people/subjects and objects are associated using outputs from the object interaction detector. At S906, setting a steady state if a person and an object are associated for a certain amount of time/time threshold. At S908, if an object identified as being associated to a person under the steady state is not associated with any person or left unattended/unassociated for a certain amount of time/time threshold, the operator is alerted of the occurrence an unattended object event. In some example implementations, the various time thresholds can be adjusted by the operator.

The foregoing example implementation may have various benefits and advantages. For example, active monitoring of all event is significantly reduced through detected association between people/subjects and objects and utilization of monitoring association status. Suspicious events can be identified by detecting association between people and objects and monitoring association status, and thus reducing resources needed in active monitoring. This association-based event detection and alerting can be applied to various events through utilization of the object interaction detectors. In addition, the object interaction detection can easily be added to existing object detection architecture as a processing step to images or videos obtained from cameras, which reduces implementation time and accelerates the deployment process.

Figure 10:
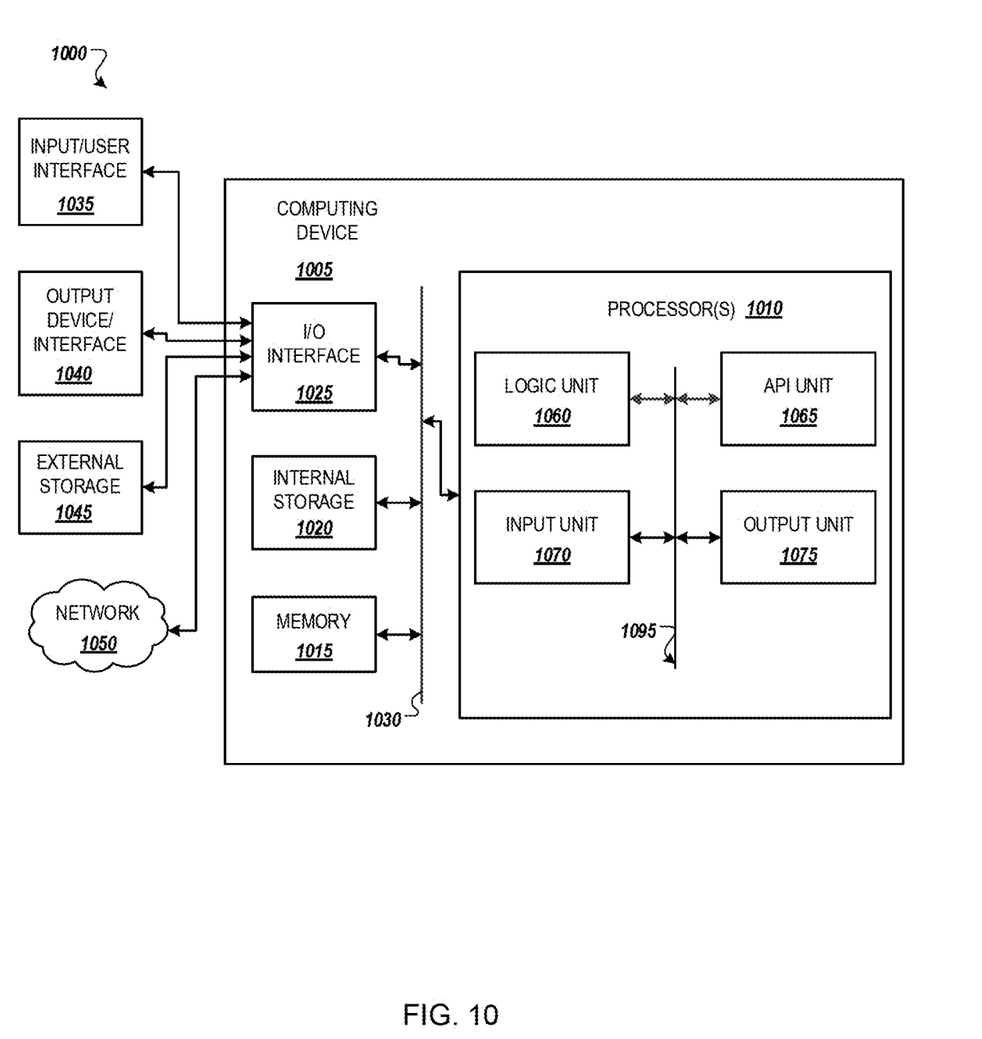
FIG. 10 illustrates an example computing environment with an example computer device suitable for use in some example implementations.

FIG. 10 illustrates an example computing environment with an example computer device suitable for use in some example implementations. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of the input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via JO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

IO interface 1025 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, the input unit 1070, the output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide an output based on the calculations described in example implementations.

Processor(s) 1010 can be configured to obtain an image, wherein the image contains the subjects and the plurality of objects as illustrated in FIGS. 3 and 4. The processor(s) 1010 may also be configured to extract the subjects and the plurality of objects in the image through first feature extraction as illustrated in FIGS. 3 and 4. The processor(s) 1010 may also be configured to detect object interactions between the subjects and the plurality of objects as illustrated in FIGS. 3 and 4. The processor(s) 1010 may also be configured to track, through second feature extraction, subject-object pairs having detected object interactions as illustrated in FIGS. 3 and 4. The processor(s) 1010 may also be configured to store bounding boxes and interaction bounding boxes associated with the subject-object pairs and the object interaction information in a database as illustrated in FIGS. 3 and 4.

The processor(s) 1010 may also be configured to generate subject-interaction bounding boxes between the generated bounding boxes over the extracted subjects as illustrated in FIGS. 6 and 7. The processor(s) 1010 may also be configured to calculate, for each of the subject interaction bounding boxes, distance between center of a first subject bounding box over a first subject and closest vertex of an interaction bounding box associated with the first subject bounding box, and distance between center of a second subject bounding box over a second subject associated with the interaction bounding box and closest vertex of the interaction bounding box as illustrated in FIGS. 6 and 7. The processor(s) 1010 may also be configured to determine subject pairs as having group interactions based on the calculated distances and generating group interaction information associated with the subject pairs as illustrated in FIGS. 6 and 7. The processor(s) 1010 may also be configured to store bounding boxes and subject-interaction bounding boxes associated with the subject pairs and the group interaction information in a database as illustrated in FIGS. 6 and 7.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for tracking and monitoring subjects and a plurality of objects, comprising:
   obtaining an image, wherein the image contains the subjects and the plurality of objects;
   extracting the subjects and the plurality of objects in the image through first feature extraction;
   detecting object interactions between the subjects and the plurality of objects; and
   tracking, through second feature extraction, subject-object pairs having detected object interactions,
   wherein the detecting the object interactions between the subjects and the plurality of objects further comprises:
      generating bounding boxes over the extracted subjects and the extracted plurality of objects;
      generating interaction bounding boxes between the generated bounding boxes over the extracted subjects and the generated bounding boxes over the extracted plurality of objects;
      calculating, for each of the interaction bounding boxes, distance between center of a bounding box over an extracted subject and closest vertex of an interaction bounding box associated with the bounding box over the extracted subject, and distance between center of a bounding box over an extracted object associated with the interaction bounding and closest vertex of the interaction bounding box; and
      determining the subject-object pairs as having object interactions based on the calculated distances and generating objecting interaction information associated with the subject-object pairs,
   wherein the tracking, through the second feature extraction, the subject-object pairs having detected object interactions comprises:
      tracking the subject-objects pairs to identify object relation status associated with objects of the subject-object pairs,
      in response to ownership change being detected in association with a subject-object pair or ownership change being detected outside a subject pair, modifying object relation status for the object changes to abnormal state and issuing an alert to an operator.

2. The method of claim 1, further comprising:
storing bounding boxes and interaction bounding boxes associated with the subject-object pairs and the object interaction information in a database.

3. The method of claim 1, further comprising:
generating subject-interaction bounding boxes between the generated bounding boxes over the extracted subjects;
calculating, for each of the subject interaction bounding boxes, distance between center of a first subject bounding box over a first subject and closest vertex of an interaction bounding box associated with the first subject bounding box, and distance between center of a second subject bounding box over a second subject associated with the interaction bounding box and closest vertex of the interaction bounding box; and
determining subject pairs as having group interactions based on the calculated distances and generating group interaction information associated with the subject pairs.

4. The method of claim 3, further comprising:
storing bounding boxes and subject-interaction bounding boxes associated with the subject pairs and the group interaction information in a database.

5. The method of claim 1, wherein if ownership change of an object is not detected in association with a subject-object pair or if ownership change of an object occurs only within a subject pair, then object relation status for the subject-object pair becomes steady state if object relationship remains unchanged beyond a first threshold amount of time.

6. The method of claim 5, wherein if an object from a subject-object pair having object relation status of steady state is left unassociated with any subject a second threshold amount of time, then object relation status for the object changes to abnormal state and an alert is issued to the operator.

7. A non-transitory computer readable medium, storing instructions for tracking and monitoring subjects and a plurality of objects, the instructions comprising:
obtaining an image, wherein the image contains the subjects and the plurality of objects;
extracting the subjects and the plurality of objects in the image through first feature extraction;
detecting object interactions between the subjects and the plurality of objects; and
tracking, through second feature extraction, subject-object pairs having detected object interactions,
wherein the detecting the object interactions between the subjects and the plurality of objects further comprises:
generating bounding boxes over the extracted subjects and the extracted plurality of objects;
generating interaction bounding boxes between the generated bounding boxes over the extracted subjects and the generated bounding boxes over the extracted plurality of objects;
calculating, for each of the interaction bounding boxes, distance between center of a bounding box over an extracted subject and closest vertex of an interaction bounding box associated with the bounding box over the extracted subject, and distance between center of a bounding box over an extracted object associated with the interaction bounding and closest vertex of the interaction bounding box; and
determining the subject-object pairs as having object interactions based on the calculated distances and generating objecting interaction information associated with the subject-object pairs,
wherein the tracking, through the second feature extraction, the subject-object pairs having detected object interactions comprises:
tracking the subject-objects pairs to identify object relation status associated with objects of the subject-object pairs,
in response to ownership change being detected in association with a subject-object pair or ownership change being detected outside a subject pair, modifying object relation status for the object changes to abnormal state and issuing an alert to an operator.

8. The non-transitory computer readable medium of claim 7, further comprising:
storing bounding boxes and interaction bounding boxes associated with the subject-object pairs and the object interaction information in a database.

9. The non-transitory computer readable medium of claim 7, further comprising:
generating subject-interaction bounding boxes between the generated bounding boxes over the extracted subjects;
calculating, for each of the subject interaction bounding boxes, distance between center of a first subject bounding box over a first subject and closest vertex of an interaction bounding box associated with the first subject bounding box, and distance between center of a second subject bounding box over a second subject associated with the interaction bounding box and closest vertex of the interaction bounding box; and
determining subject pairs as having group interactions based on the calculated distances and generating group interaction information associated with the subject pairs.

10. The non-transitory computer readable medium of claim 9, further comprising:
storing bounding boxes and subject-interaction bounding boxes associated with the subject pairs and the group interaction information in a database.

11. The non-transitory computer readable medium of claim 7, wherein if ownership change of an object is not detected in association with a subject-object pair or if ownership change of an object occurs only within a subject pair, then object relation status for the subject-object pair becomes steady state if object relationship remains unchanged beyond a first threshold amount of time.

12. The non-transitory computer readable medium of claim 11, wherein if an object from a subject-object pair having object relation status of steady state is left unassociated with any subject a second threshold amount of time, then object relation status for the object changes to abnormal state and an alert is issued to the operator.

* * * * *